May 4, 1954 H. CHIREIX 2,677,806

PHASE-MODULATED PIEZOELECTRIC CRYSTAL OSCILLATOR SYSTEM

Filed March 16, 1950

INVENTOR

Henri CHIREIX

By Fritz G. Hochwald

Agent

Patented May 4, 1954

2,677,806

UNITED STATES PATENT OFFICE 2,677,806

PHASE-MODULATED PIEZOELECTRIC CRYSTAL OSCILLATOR SYSTEM

Henri Chireix, Paris, France, assignor to Societe Francaise Radio-Electrique, a corporation of France Application March 16, 1950, Serial No. 150,070

9 Claims. (Cl. 332—19)

My invention relates to a method and an arrangement that make it possible to constitute merely in hyperfrequencies, phase-modulated multiplex transmitters operating on a large number of channels, the general carrier frequency having the stability of a piezo-electric quartz controlled generator, from a frequency-modulated wave, the stability of frequency of which may be much lower.

In its broad sense, the problem has already been solved by subjecting the frequency-modulated wave to a double frequency-change, on the one hand by means of a frequency supplied by a quartz-controlled generator, and on the other hand by means of the frequency obtained by this first frequency-change after it has passed through a delay member. At the output after the last frequency-change, a phase-modulated wave is obtained, the frequency of which is that of the quartz-controlled generator, the frequency of said wave being multiplied, if desired, by means of frequency-multiplying stages.

The ensuing description, made with reference to the accompanying drawings, will enable the known method and the method according to the invention to be understood more clearly.

Figure 1:
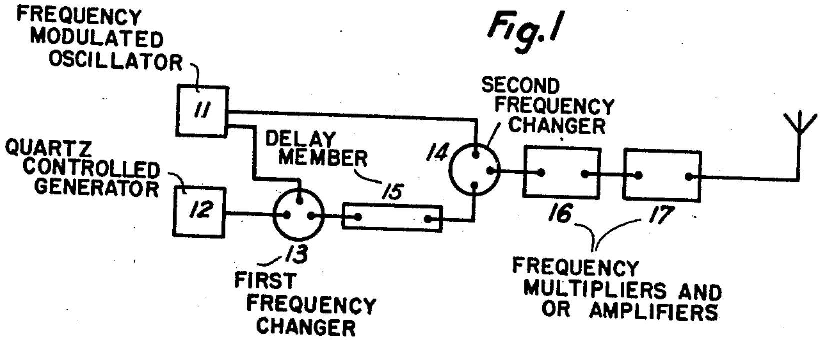
Fig. 1 is a block diagram of an arrangement employing the known method.

The original frequency-modulation is preferably obtained by means of a reflex klystron 11 or of any other oscillator that has a wide electronic tuning band. Let $f_k$ be its mean frequency and $f_t$ the variation of instantaneous frequency as a function of the time ($f_t$ is thus positive or negative and the instantaneous frequency is $f_k+f_t$). After frequency-change by means of a frequency $f_q$ produced by a quartz-controlled generator 12, a wave of frequency $f_k+f_t-f_q$ will be obtained at the output terminals of the frequency-changer 13. The two possibilities of frequency-change will be included by making $f_q$ positive or negative. After said wave has passed through a delay member 15, it is fed to a second frequency-changer 14 together with the original frequency-modulated wave which has been suitably attenuated. At the output terminals of the second frequency-changer a wave will be obtained, the frequency of which is that of the quartz-controlled generator and which will be phase-modulated. In reality, the foregoing reasoning is only partly correct since it allows it to be supposed that by indefinitely increasing the sensitivity of the delay member to the variations of frequency it would be possible to obtain as great a phase deviation as desired.

The following is a more correct reasoning: A delay member, the phase variation of which is linearly proportional to the frequency variation is a member that produces a delay $\tau$ which is independent of the frequency. Such a member may for example be formed by a section of non-pupinized cable, i. e. which is free from phase distortion.

If such a member 15 is connected according to the diagram of Fig. 1, the second frequency-changer receives on the one hand the wave $f_k+f_t$ and on the other hand the wave $f_k(t-\tau)+f_t(t-\tau)-f_q$.

By suitably choosing the origin of the times it can be seen that one of the two beats that issue from the second frequency-changer corresponds to the frequency:

$$\left[f_q+f_k\left(t+\frac{\tau}{2}\right)-f_k\left(t-\frac{\tau}{2}\right)\right]+\left[f\left(t+\frac{\tau}{2}\right)-f\left(t-\frac{\tau}{2}\right)\right] \quad (1)$$

If it is assumed that the (carrier) frequency $f_k$ has not varied during the period $\tau$, the following frequency is obtained:

$$f_q+\left[f\left(t+\frac{\tau}{2}\right)-f\left(t-\frac{\tau}{2}\right)\right] \quad (2)$$

In the case in which the retardation line is interposed in the path of the wave that has not undergone frequency-change, the following frequency would similarly be obtained:

$$f_q-\left[f\left(t+\frac{\tau}{2}\right)-f\left(t-\frac{\tau}{2}\right)\right] \quad (3)$$

in particular for $\tau=0$ this wave is $f_q$ and consequently is not modulated.

Assume a sinusoidal modulation at the pulsations $\Omega=2\Pi F$, F being the modulation frequency; $f_t$ is then of the form:

$$f_t=f_0 \sin \Omega t$$

and the instantaneous frequency of the wave obtained is:

$$f_q\pm\left[f_0 \sin \Omega\left(t+\frac{\tau}{2}\right)-f \sin \Omega\left(t-\frac{\tau}{2}\right)\right]$$

or:

$$f_q\pm 2f_0 \sin \Omega\frac{\tau}{2} \cos \Omega t \quad (4)$$

this is equivalent to a phase modulation at the frequency $f_q$ having as its index:

$$2\pi f_0 \tau \left( \frac{\sin \Omega\frac{\tau}{2}}{\Omega\frac{\tau}{2}} \right) \qquad (5)$$

The expression (5) implies limitations in the value of $\tau$, since it can be seen that for the original frequency-modulation to be converted into phase modulation it is necessary that:

$$\frac{\sin \Omega\frac{\tau}{2}}{\Omega\frac{\tau}{2}} = \frac{\sin \pi F\tau}{\pi F\tau} \cong 1$$

In practice this limits $\tau$ to $$\tau = \frac{1}{4} \cdot \frac{1}{F}$$

or even less, viz. $\tau = \frac{1}{4}$ of a microsecond for $F_{max} = 1$ megacycle.

It is obvious that if it were assumed that $F\tau = 1$, the phase modulation would become zero for this frequency F owing to the fact that at the location of the second frequency-changer the instantaneous frequency at the inlet of the retardation line would be found at every instant. It should nevertheless be noted that a considerable delay $\tau$ changes the sensitivity of the conversion from frequency-modulation to phase-modulation but not the linearity of said conversion as a function of the initial frequency deviation $f_o$.

This being the case, it can nevertheless be seen that despite everything, the retardation line that has to be provided is of considerable length and has to produce a delay of about ¼ of a microsecond for $F_{max} = 1$ mc. if it is desired to have a fairly good sensitivity. This represents 75 metres of air dielectric cable or about 50 metres if a cable with a solid dielectric such as polythene is used.

On the other hand, a cable such as one which is insulated with polythene has considerable hyperfrequency losses. The attenuation which is substantially independent of the diameter of the cable is proportional to the frequency and is about 100 to 120 decibels per microsecond of delay for a frequency of about 3,000 mc. Finally, in order to carry out the method hereinbefore described with reference to Fig. 1 it is necessary to insert filters for eliminating the unwanted frequencies.

According to the invention which is the subject of the present patent, it is proposed to provide a simple arrangement which makes use of the method referred to and in which the retardation line hereinbefore defined can on the one hand be reduced in length by half and on the other hand also perform the function of a wave filter by taking advantage of the variation of its attenuation proportionally to the frequency. For this purpose the frequency-modulated wave, the mean frequency of which is $f_k$ and which may be supplied for example by a reflex klystron modulated on the reflex electrode, passes through a retardation line formed by a cable with a dielectric filling; said wave undergoes therein a delay of $$\frac{\tau}{2}$$

and a comparatively high degree of attenuation. At the end of said line is arranged a modulator formed by a frequency-changer crystal which is also excited by means of a frequency $f_q$ of the same order of magnitude as $f_k$ so that a beat-frequency of relatively low value is produced. This beat-frequency passes through the retardation line in the opposite direction and thereby undergoes a further delay $$\frac{\tau}{2}$$

and only one attenuation. Thus there is found at the input end of the line, i. e. at the output end of the reflex klystron, on the one hand the wave emitted by said klystron $$f_k + f\left(t + \frac{\tau}{2}\right)$$

with a high level of power, and on the other hand the echo of said wave on the frequency $$f_k + f\left(t - \frac{\tau}{2}\right) - f_q$$

with a much lower power level but nevertheless much higher than the level that corresponds to the frequency $$f_k + f\left(t - \frac{\tau}{2}\right) + f_q$$

which in turn is much higher. Therefore, by connecting in parallel with the generator (reflex klystron) a second frequency-changer crystal preferably at the end of a second line, the delaying action of which is unimportant but the attenuation of which increases with the frequency, and by selecting the upper beat and suitably determining the delay of the first line according to what has been explained, a very stable phase-modulated wave of mean frequency $f_q$ will be obtained.

Figure 2:
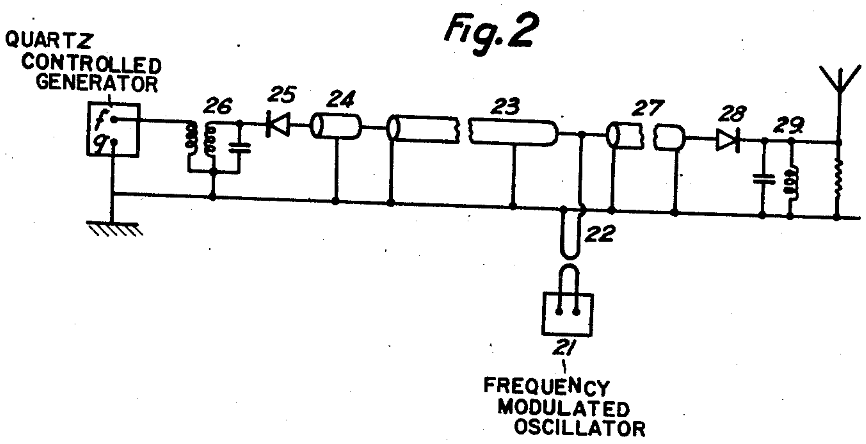
Fig. 2 is a wiring diagram of an arrangement according to the present invention.

The invention will be more clearly understood by referring to the ensuing description, made with reference to Fig. 2 of the accompanying drawing.

A reflex klystron shown at 21 is frequency-modulated on its reflex electrode by means of modulating voltages that may have $f_{max} = 1$ mc. It is coupled by a loop 22, the length of which will be specified, to two cables 23 and 27 which are of the same characteristic impedance and the attenuation of which is proportional to the frequency. It will be assumed that the klystron has a mean frequency $f_k = 3{,}900$ mc. and supplies 0.1 watt to each of the cables, i. e. the level −10 db for 1 watt. On the one hand to the terminals of the klystron is connected the line 23, the delay of which is $$\frac{\tau}{2} = \frac{1}{8}$$

of a microsecond and the attenuation of which will be assumed to be proportional to the frequency with a rate of increase of 0.5 db per 100 mc.

The line 23 is continued by a quarter-wave section on the frequency $f_k$ which is of different characteristic impedance and which performs the function of an impedance matcher. The line 24 is connected to a frequency-changer crystal 25 which is also excited by the circuit 26 on the frequency $f_q$, the stability of which is quartz-controlled. It will be assumed that $f_q = 3{,}600$ mc. and that the available power is a few milliwatts on this frequency.

To the terminals of the klystron is connected on the other hand a line 27 which may have any time of propagation but which will be assumed to have the same attenuation at the various frequencies as the line 23. Finally, said line 27 is connected to a second frequency-changer crystal 28 in series with a circuit 29 which is also tuned to the frequency $f_q$.

The operation of the arrangement can then be explained as follows:

By suitably choosing the characteristic impedance of the quarter-wave element 24, it is possible to match the mean resistance of the detector 25 with the line 23 so that when, by the action of the modulation applied at 26, its resistance varies from the "direct resistance" value to the "inverse resistance" value, the coefficients of reflection introduced at the joint 23, 24 by the bad matching assume values which are substantially equal but of opposite signs. For the case of the direct resistance there will be a reflection which is in phase, and for the case of the inverse resistance a reflection in phase opposition. This will produce a more or less complete modulation of the incident wave and the carrier is theoretically eliminated.

Assuming a conversion loss of 10 db. for example, it can be seen that the crystal 25 receives the frequency of the klystron 21 with a delay $$\frac{\tau}{2}$$

and attenuated by 39×0.5=19.5 db, i. e. the absolute level −29.5 db. The frequency-change will produce a beat on 3,900−3,600=300 mc./s. and this beat will be found again at the joint between 23 and 27, attenuated by 3×0.5=1.5 db. The absolute level at this point on this frequency will therefore be −29.5−10−1.5=−41 db for 1 watt.

However, this will only be true if the loop 22 does not by-pass this frequency. It is therefore necessary to give to said loop such a dimension that it corresponds for example to a quarter wave at 300 mc./s.

At the location of the detector 28, the 300 mc./s. beat will be further attenuated by an additional 1.5 db, i. e. the absolute level −42.5 db whereas the wave of the klystron will reach the detector 28 as it reached 25, with the level −29.5 db.

The difference of 13 db is due to the conversion losses at 25 estimated to be 10 db and to the total attenuation of 23 and of 27 at the beat frequency.

At the terminals of 29 the wave of frequency $f_q$ will be obtained phase-modulated.

It will be seen on the other hand that if the reasoning is applied to the other beat which is supplied by 25 and the mean frequency of which is 3,900+3,600=7,500 mc./s., the level obtained at 28 will be 72 db below, the attenuation along 23 and 27 for this wave being 75 db instead of 3 (ratio between the frequencies 7,500 and 300). It will also be noted that the direct frequency $f_q$ is not transmitted to the frequency-changer 28 owing to an attenuation of 36 db introduced on that frequency by the lines 23 and 27 and to the fact that the loop 22 behaves for said frequency as a short-circuit (12 quarter-waves).

This gives rise to the additional condition that it is advantageous for the beat frequency to be an even submultiple of the frequency $f_q$.

Finally, it may be assumed that a little of the voltage at the frequency of the klystron, which is returned from 25 owing to a deficient elimination of the carrier in the first frequency-changer, reaches the joint between 23 and 27. This residue is also highly attenuated owing to the characteristics of the cable.

Although it is not shown, it is also advantageous to connect between 27 and 28 a matching element such as 24 in respect of 25, if the crystal is not of the suitable impedance.

It can be seen on the other hand that the line 27, which is not essential, is very useful for producing an additional selective attenuation. This line, the delaying action of which does not perform any function and only the attenuating action of which is used, may be very short as compared with the line 23 if it is systematically provided in the form of a section of high-loss dielectric cable.

Of course, neither the embodiment of Fig. 2, nor the numerical example chosen, are of a restrictive nature. Any arrangement which is similar to the object of the invention and in which, in order to reduce the size of the retardation line, the frequency-modulated wave from the generator is passed a first time in one direction through said line and this same wave, after undergoing a frequency-change, is passed a second time through this line, falls within the scope of the invention.

What I claim is:

1. An arrangement for hyperfrequency transmission, comprising a source of undelayed frequency-modulated waves, a source of quartz-stabilized unmodulated waves having a frequency different from the mean frequency of the undelayed frequency-modulated waves, a delay member, a first frequency-changer, means for enabling said first frequency-changer to receive, on the one hand the frequency-modulated waves after the same have passed through said delay member, and on the other hand the quartz-stabilized unmodulated waves, so as to produce beat waves, a second frequency-changer, means for enabling said second frequency-changer to receive, on the one hand the beat waves after the same have passed through the said delay member, and on the other hand the undelayed frequency-modulated waves, so as to produce phase-modulated waves having the quartz-stabilized frequency as a carrier.

2. Arrangement as claimed in claim 1, said frequency-changers including crystals.

3. Arrangement as claimed in claim 1, said delay member being designed as a retardation line.

4. An arrangement for hyperfrequency transmissions, comprising a source of undelayed frequency-modulated waves, a source of quartz-stabilized unmodulated waves having a frequency different from the mean frequency of the undelayed frequency-modulated waves, a retardation line, a first frequency-changer, an impedance matching device interposed between said retardation line and said first frequency-changer, means for enabling said first frequency-changer to receive, on the one hand the frequency-modulated waves after the same have passed through said retardation line and said impedance matching device, and on the other hand the quartz-stabilized unmodulated waves, so as to produce beat waves, a second frequency-changer, means for enabling said second frequency-changer to receive, on the one hand the beat waves after the same have passed through said retardation line, and on the other hand the undelayed frequency-modulated waves, so as to produce phase-modulated waves having the quartz-stabilized frequency as a carrier.

5. Arrangement as claimed in claim 4, said impedance matching device being designed as a section of coaxial line having a characteristic impedance different from that of said retardation line, and a length corresponding to a quarter-wave at the mean frequency of the frequency-modulated waves.

6. An arrangement for hyperfrequency transmissions, comprising a source of frequency-modulated waves, a source of quartz-stabilized unmodulated waves having a frequency different from the mean frequency of the modulated waves, a retardation line, a first frequency-changer, an impedance matching device interposed between said retardation line and said first frequency-changer, means for enabling said first frequency-changer to receive, on the one hand the frequency-modulated waves after the same have passed through said retardation line and said impedance matching device, and on the other hand the quartz-stabilized unmodulated waves, so as to produce beat waves, a second frequency-changer, an attenuating member, means for enabling the second frequency-changer to receive, on the one hand the beat waves obtained from the first frequency-changer after the same have passed through said unretardation line, and on the other hand the undelayed original modulated waves, after both the beat waves and the original unmodulated waves have passed through said attenuating member, and means for collecting the waves issued from said second frequency-changer, the collected waves being phase-modulated and having a carrier-frequency being equal to the frequency of the quartz-stabilized source.

7. Arrangement as claimed in claim 6, said attenuating member being designed as a coaxial line section attenuating waves passing through the same proportionally to the frequencies thereof.

8. Arrangement as claimed in claim 6, and a loop coupling said source of frequency-modulated waves to said retardation line, the length of said loop corresponding to a quarter wave at the smallest beat frequency obtained from said first frequency-changer.

9. Arrangement as claimed in claim 6, the difference between the mean frequency of the frequency-modulated waves and the frequency of the quartz-stabilized waves being an even submultiple of the latter frequency.

References Cited in the file of this patent

UNITED STATES PATENTS

| Number | Name | Date |
|---|---|---|
| 2,289,041 | Roberts | July 7, 1942 |
| 2,347,398 | Crosby | Apr. 25, 1944 |
| 2,473,318 | Weighton | June 14, 1949 |